United States Patent [19]

Payne

[11] 4,314,532

[45] Feb. 9, 1982

[54] METHOD AND APPARATUS FOR TRANSLATING FREQUENCY OF MECHANICAL MOVEMENT INTO A PNEUMATIC SIGNAL

[75] Inventor: Frank Payne, Knoxville, Tenn.

[73] Assignee: Robertshaw Controls Company, Richmond, Va.

[21] Appl. No.: 160,372

[22] Filed: Jun. 17, 1980

[51] Int. Cl.³ .................. F02M 25/06; F02B 71/00
[52] U.S. Cl. .................. 123/198 A; 123/198 C; 123/350; 123/378; 123/360; 123/571; 417/410; 417/411; 417/413; 417/417
[58] Field of Search .......... 123/571, 350, 378, 198 C, 123/360, 198 A; 417/417, 418, 410, 411, 413

[56] References Cited

U.S. PATENT DOCUMENTS

| | | | |
|---|---|---|---|
| 2,638,849 | 5/1953 | Budlane | 417/413 |
| 3,483,823 | 12/1969 | Palmer | 417/417 |
| 3,754,154 | 8/1973 | Massie | 417/418 |
| 3,819,305 | 6/1974 | Klochemann | 417/413 |
| 3,825,374 | 7/1974 | Kondo | 417/413 |
| 3,830,596 | 8/1974 | Kondo | 417/413 |
| 4,086,518 | 4/1978 | Wilkinson | 417/417 |
| 4,095,922 | 6/1978 | Farr | 417/411 |
| 4,162,876 | 7/1979 | Kolfertz | 417/413 |
| 4,180,377 | 12/1979 | Itakura | 417/413 |

*Primary Examiner*—Wendell E. Burns
*Attorney, Agent, or Firm*—Candor, Candor & Tassone

[57] ABSTRACT

An apparatus and method having a first unit for creating mechanical movement with a certain frequency of-movement. A second unit is operatively associated with the first unit for producing a pulsing electrical signal that has a pulse rate substantially proportional to the frequency of movement. A third unit is operatively associated with the second unit for producing a pneumatic signal that is substantially proportional to the pulse rate of the pulsing electrical signal.

30 Claims, 1 Drawing Figure

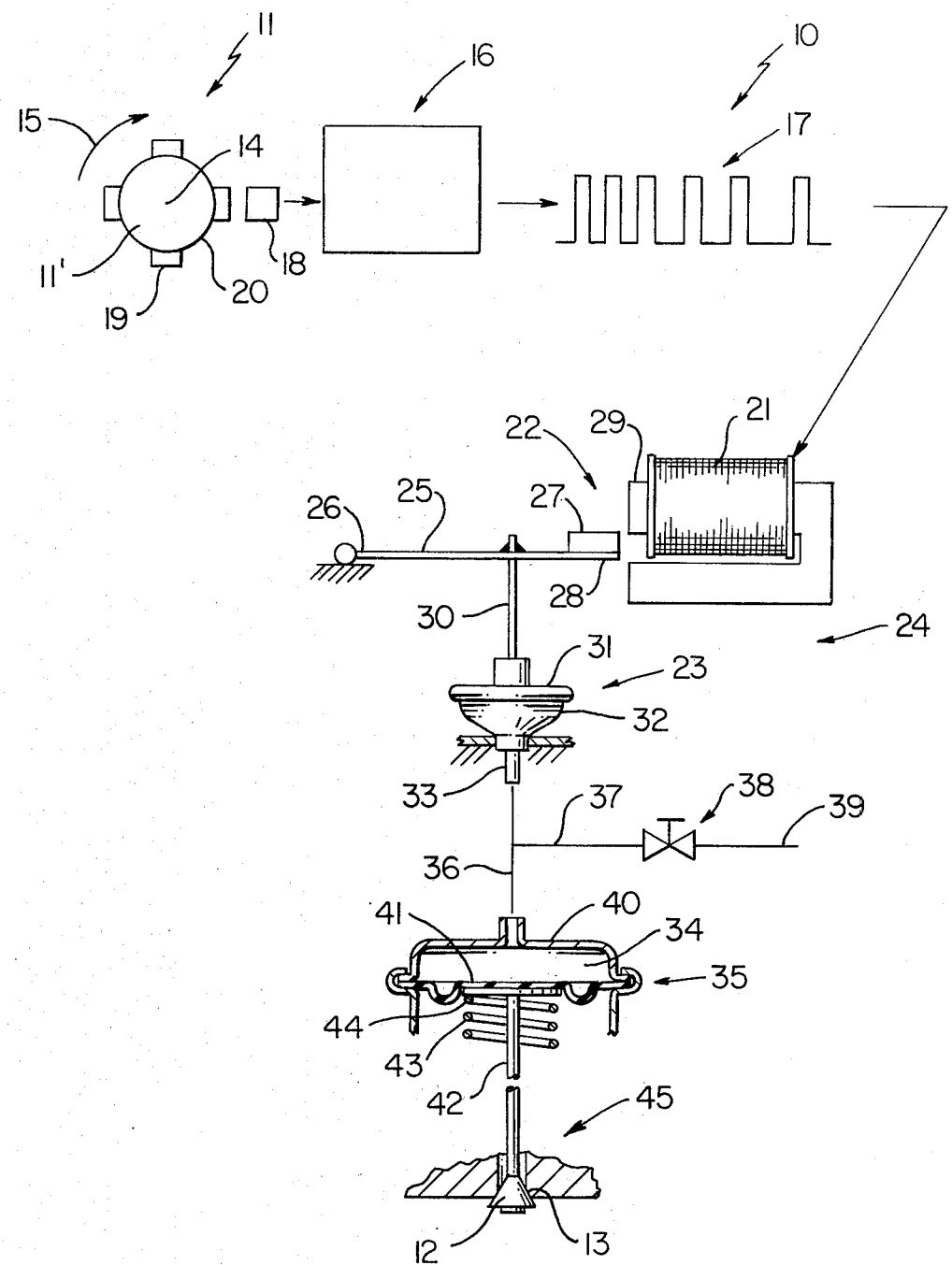

METHOD AND APPARATUS FOR TRANSLATING FREQUENCY OF MECHANICAL MOVEMENT INTO A PNEUMATIC SIGNAL

BACKGROUND OF THE INVENTION

1. Field of the Invention

This invention relates to an apparatus and method for converting or translating mechanical movement into a pneumatic signal that has a value substantially proportional to the frequency of the mechanical movement.

2. Prior Art Statement

Applicant is unaware of any system wherein mechanical movement is provided with a certain frequency of movement and means are provided for creating a pneumatic signal that has a value that is substantially proportional to that frequency of movement.

SUMMARY OF THE INVENTION

It is a feature of this invention to provide a system wherein frequency of mechanical movement can be converted or translated into a pneumatic signal that has a value that is substantially proportional to that frequency of mechanical movement.

This feature is accomplished by this invention by first converting or translating the mechanical movement into a pulsing electrical signal that has a pulse rate substantially proportional to the frequency of movement and then producing a pneumatic signal that has a value that is substantially proportional to the pulse rate of the pulsing electrical signal.

In particular, one embodiment of the apparatus of this invention has a first means for creating mechanical movement with a certain frequency of movement, a second means operatively associated with the first means for producing a pulsing electrical signal that has a pulse rate substantially proportional to the frequency of movement, and a third means operatively associated with the second means for producing a pneumatic signal that is substantially proportional to the pulse rate of the pulsing electrical signal.

Accordingly, it is an object of this invention to provide an apparatus for creating a pneumatic signal that has a value that is substantially proportional to the frequency of mechanical movement, the apparatus of this invention having one or more of the novel features of this invention as set forth above or hereinafter shown or described.

Another object of this invention is to provide a method of providing a pneumatic signal that has a value that is substantially proportional to the frequency of mechanical movement, the method of this invention having one or more of the novel features of this invention as set forth above or hereinafter shown or described.

Other objects, uses and advantages of this invention are apparent from a reading of this description which proceeds with reference to the accompanying drawing forming a part thereof and wherein:

BRIEF DESCRIPTION OF THE DRAWING

The drawing illustrates schematically one embodiment of the method and apparatus of this invention for translating frequency of mechanical movement into a pnuematic signal that has a value substantially proportional to that frequency of mechanical movement.

DESCRIPTION OF THE PREFERRED EMBODIMENT

While the various features of this invention are hereinafter described and illustrated as being particularly adapted to provide means for positioning a valve member relative to a valve seat in relation to the RPM of a shaft means, it is to be understood that the various features of this invention can be utilized singly or in any combination thereof to provide a control system for other types of devices as desired.

Therefore, this invention is not to be limited to only the embodiment illustrated in the drawing, because the drawing is merely utilized to illustrate one of the wide variety of uses of this invention.

Referring now to the drawing, the apparatus and method or system of this invention is generally indicated by the reference numeral 10 and comprises a first means or unit 11 that produces mechanical movement of a member 11' thereof in a manner hereinafter described with such mechanical movement of the member 11' being with various certain rates of frequency of movement that will be utilized in the system 10 to position a valve member 12 relative to a valve seat 13 substantially proportionally to the particular frequency of movement being produced by the member 11' in a manner hereinafter described within predetermined ranges of frequencies of movement and degrees of opening of the valve member 12 relative to valve seat 13 as will be apparent hereinafter.

In the embodiment illustrated in the drawing, the member 11' comprises a shaft means adapted to rotate about its axis 14 in the clockwise direction indicated by the arrow 15 at various rates of rotation thereof. For example, the shaft means 11' can comprise a crankshaft of an internal combustion engine which has the rate of turning the crankshaft 11' substantially infinitely variable between no rotation thereof and a substantially high RPM as is conventional with internal combustion engines for transportation vehicles and the like.

The apparatus and method 10 of this invention has a second means or unit 16 for detecting the frequency of movement of the member 11' of the first means or unit 11 and converting or translating the same to a pulsing electrical signal that has a pulse rate substantially proportional to the particular frequency of movement being detected by the means or unit 16, the pulsing electrical signal being generally indicated by the reference numeral 17 in the drawing.

While the second means or unit 16 can comprise any conventional electrical pulse generator, the particular unit 16 illustrated has a pickup or detector 18 which senses the frequency of movement of a plurality of permanent magnets 19 carried on the outer periphery 20 of the shaft 11' as the same rotate past the detector 18.

The detected frequency of movement of the magnets 19 past the detector or pickup 18 is converted and amplified by the unit 16 in a manner well known in the art into a pulsing direct current signal 17 that is fed to a coil 21 of an electromagnetic drive means 22 that is interconnected to a pneumatic pump 23 to operate the same in a manner hereinafter described whereby the electromagnetic drive means 22 and pump 23 comprise a third means or unit for the system 10 of this invention and is generally indicated by the reference numeral 24. Thus, the third means or unit 24 translates or convertes the pulsing electrical signal 17 into a pneumatic signal that has a value that is substantially proportional to the pulse rate of that pulsing electrical signal 17 and, thus, substantially proportional to the frequency of mechanical movement of the member 11'.

The electromagnetic drive means 22 for the pump 23 comprises a pivotally mounted armature 25 that is pivoted at an end 26 thereof and carries a permanent magnet 27 on another end 28 thereof to be pulled into substantial alignment with a core 29 of the coil 21 when the coil 21 has an electrical current flowing therethrough in a manner well known in the art, the armature 25 returning to the position illustrated in the drawings when there is no current flowing through the coil 21. Thus, a pulsing electrical current flowing through the coil 21 of the electromagnetic drive means 22 will cause an oscillating up and down movement of the armature 25 about its pivot point 26 with a frequency substantially proportional to the pulse rate of the electrical signal 17.

The armature 25 of the electromagnetic drive means 22 is interconnected to a plunger or rod 30 that is secured to a flexible diaphragm 31 of the pump 23 so that the diaphragm 31 is pulled upwardly and downwardly relative to the main body 32 of the pump 23 to create a pneumatic flow of fluid into the pump 23 and out through an output means 33 thereof in a manner conventional in the electromagnetically driven pump art.

Thus, it can be seen that the pump 23 of the unit 24 of this invention will create a pneumatic signal or pneumatic volume that has a value that is substantially proportional to the pulse rate of the pulsing electrical signal 17 which, in turn, is substantially proportional to the frequency of mechanical movement of the member 11' of the unit 11. Accordingly, the pneumatic signal or pneumatic volume being created by the unit 24 is substantially proportional to the frequency of movement of the member 11' of the unit 11 of this invention.

The method and apparatus 10 of this invention as illustrated in the drawing utilizes such pneumatic signal for positioning the valve member 12 relative to the valve seat 13 by interconnecting the output 33 of the pump 23 to an actuating chamber 34 of a pneumatically operated positioning device 35, the output 33 being interconnected to the chamber 34 by a suitable conduit means 36 that has a branch conduit means 37 interconnected thereto intermediate the pneumatically operated device 35 and the pump 23.

The branch conduit 37 has a bleed means 38 therein for interconnecting the branch conduit 37 to a vent outlet 39, the bleed means 38 being adjustable to control the rate of bleed of fluid flow therethrough to the outlet 39 for a purpose hereinafter described.

The pneumatically operated positioning actuator 35 has a housing means 40 cooperating with a flexible diaphragm 41 to define the actuating chamber 34 therebetween, the flexible diaphragm 41 carrying a plunger or rod 42 that is interconnected to the valve member 12 as illustrated.

A compression spring 43 is carried by the device 35 and has one end 44 thereof bearing against the flexible diaphragm 41 in a direction to tend to urge the valve member 12 to its closed position against the valve seat 13.

However, as the pneumatic pressure of the fluid being directed or pumped to the actuating chamber 34 of the device 35 by the actuated pump 23 increases, the resulting pressure differential acting across the diaphragm 41 will cause the diaphragm 41 to move downwardly in opposition to the force of the compression spring 43 to position the valve member 12 in a certain open position relative to the valve seat 13 in relation to the value of the pneumatic signal in the actuating chamber 34 whereby it can be seen that as the value of the pneumatic signal being created by the pump 23 increases, the valve member 12 is positioned to a more open position relative to the valve seat 13 and such positioning is substantially proportional to the frequency of movement of the member 11' of the unit 11.

By adjusting the rate of bleed of the fluid to the vent outlet 39 through the bleed means 38 in the branch conduit 37, it can be seen that the bleed means 38 can serve as a calibration means to set the rate of positioning of the valve member 12 by the value of the pneumatic signal to the frequency of movement range of the member 11' of the unit 11.

Therefore, it can be seen that the apparatus and method 10 of this invention can be formed from a relatively few readily available parts and be uniquely assembled and interconnected together to operate in a manner to provide a means or system for translating or converting a frequency of mechanical movement to a pneumatic signal that has a value that is substantially proportional to that frequency of mechanical movement and can be utilized for any desired useful purpose, such as for positioning a valve member 12 relative to a valve seat 13 which arrangement can comprise an exhaust gas recirculation valve means 45 for the internal combustion engine which drives the member 11' of the unit 11 of this invention.

The operation of the method and apparatus 10 of this invention will now be described.

Assuming that the unit 11 has the member 11' rotating in a clockwise direction at a certain RPM, the unit 16 through its detector 18 detects that particular frequency of movement of the member 11' and converts the same into a pulsing electrical signal 17 that has a pulse rate substantially proportional to that frequency of movement of the member 11'. The pulsing electrical signal 17 is fed to the coil 21 of the unit 24 and thereby causes the drive means 22 to drive the pump 23 at a rate to produce a pneumatic signal from the output 33 thereof of a certain volume or value that is substantially proportional to the pulse rate of the pulsing electrical signal 17 and, thus, substantially proportional to the frequency of mechanical movement of the member 11' of the unit 11.

The bleed means 38 has been previously adjusted so that the particular signal being produced by the pump 23 and entering the actuating chamber 34 of the device 35 creates a certain pressure differential acting across the diaphragm 41 to move the diaphragm 41 downwardly in the drawing in opposition to the force of the compression spring 43 a certain amount so that the valve member 12 is positioned relative to the valve seat 13 in a particular open position thereof that has been previously determined as being optimum for when the member 11' is being rotated with the previously described RPM.

Therefore, it can be seen that as the frequency of movement of the member 11' changes to another particular rate of movement thereof, either slower or faster, such change is detected by the detector 18 and the unit 16 changes the pulse rate of the electrical signal 17 to correspond to the new frequency of movement of the member 11' whereby the pump 23 will produce the pneumatic signal being directed to the device 35 to a new value thereof that will position the valve member 12 relative to the valve seat 13 to a different position thereof that has been predetermined as being an optimum position for that new particular RPM of the member 11' of the unit 11. Thus, an increasing RPM of the member 11' moves the valve member 12 further from the valve seat 13 and a decreasing RPM of the member 11' moves the valve member 12 closer to the valve seat 13.

Therefore, it can be seen that this invention provides an apparatus and method for converting or translating frequency of mechanical movement into a pneumatic signal that has a value that is substantially proportional to that frequency of movement.

While the form and method of this invention now preferred have been illustrated and described as required by the Patent Statute, it is to be understood that other forms and method steps can be utilized and still fall within the scope of the appended claims.

What is claimed is:

1. In combination, first means for producing mechanical movement with a certain frequency of movement, second means operatively associated with said first means for producing a pulsing electrical signal that has a pulse rate substantially proportional to said frequency of movement, and third means operatively associated with said second means for producing a pneumatic signal that has a value that is substantially proportional to said pulse rate of said pulsing electrical signal.

2. A combination as set forth in claim 1 wherein said first means has means for varying said frequency of movement.

3. A combination as set forth in claim 1 wherein said first means comprises a rotatable shaft means whereby said mechanical movement is rotary movement of said shaft means.

4. A combination as set forth in claim 3 wherein said shaft means carries magnet means that rotate in unison therewith, said second means having detecting means for detecting the frequency of rotation of said magnet means past said detecting means.

5. A combination as set forth in claim 3 wherein said shaft means comprises a crankshaft of an internal combustion engine.

6. A combination as set forth in claim 1 wherein said second means comprises an electric pulse generator.

7. A combination as set forth in claim 6 wherein said pulsing electrical signal produced by said electric pulse generator is a pulsing direct current electrical signal.

8. A combination as set forth in claim 1 wherein said third means comprises a pneumatic pump.

9. A combination as set forth in claim 8 wherein said pneumatic pump has an output means that produces said pneumatic signal as a pnuematic fluid volume that is substantially proportional to said pulse rate of said pulsing electrical signal.

10. A combination as set forth in claim 9 wherein said third means comprises an electromagnetic drive means operatively interconnected to said pump to drive the same, said electromagnetic drive means being adapted to be operated by said pulsing electrical signal.

11. A combination as set forth in claim 9 and including a pneumatic actuator having an actuator chamber interconnected to said output means of said pump.

12. A combination as set forth in claim 11 wherein said pneumatic actuator has positioning means that is positioned in relation to the force of the pneumatic signal received in said actuator chamber thereof.

13. A combination as set forth in claim 12 wherein said positioning means comprises a valve means.

14. A combination as set forth in claim 12 and including fluid bleed means operatively interconnected to said acutator chamber.

15. A combination as set forth in claim 14 wherein said fluid bleed means is adjustable.

16. A method for producing an output comprising the steps of producing mechanical movement with a certain frequency of movement with a first means, producing a pulsing electrical signal that has a pulse rate substantially proportional to said frequency of movement with a second means, and producing a pneumatic signal that has a value that is substantially proportional to said pulse rate of said pulsing electrical signal with a third means.

17. A method as set forth in claim 16 and including the step of varying said frequency of movement of said first means.

18. A method as set forth in claim 16 and including the step of forming said first means to comprise a rotatable shaft means whereby said mechanical movement is rotary movement of said shaft means.

19. A method as set forth in claim 18 and including the steps of causing said shaft means to carry magnet means that rotate in unison therewith, and detecting the frequency of rotation of said magnetic means past detecting means of said second means.

20. A method as set forth in claim 18 and including the step of forming said shaft means to comprise a crankshaft of an internal combustion engine.

21. A method as set forth in claim 16 and including the step of forming said second means to comprise an electric pulse generator.

22. A method as set forth in claim 21 and including the step of forming said pulsing electrical signal produced by said electric pulse generator to be a pulsing direct current electrical signal.

23. A method as set forth in claim 16 and including the step of forming said third means to comprise a pneumatic pump.

24. A method as set forth in claim 23 and including the step of causing said pneumatic pump to produce said pneumatic signal as a pneumatic fluid volume out of output means of said pump that is substantially proportional to said pulse rate of said pulsing electrical signal.

25. A method as set forth in claim 24 and including the steps of forming said third means to comprise an electromagnetic drive means operatively interconnected to said pump to drive the same, and forming said electromagnetic drive means to be adpated to be operated by said pulsing electrical signal.

26. A method as set forth in claim 24 and including the step of interconnecting an actuator chamber of a pnuematic actuator to said output means of said pump.

27. A method as set forth in claim 26 and including the step of forming said pneumatic actuator to have positioning means that is positioned in relation to the force of the pneumatic signal received in said actuator chamber thereof.

28. A method as set forth in claim 27 and including the step of forming said positioning means to comprise a valve means.

29. A method as set forth in claim 27 and including the step of operatively interconnecting fluid bleed means to said actuator chamber.

30. A method as set forth in claim 29 and including the step of adjusting said fluid bleed means.

* * * * *